Nov. 5, 1929.  L. J. BROWN  1,734,712
BRAKE HANGER SUPPORT
Filed Dec. 24, 1925  2 Sheets-Sheet 1
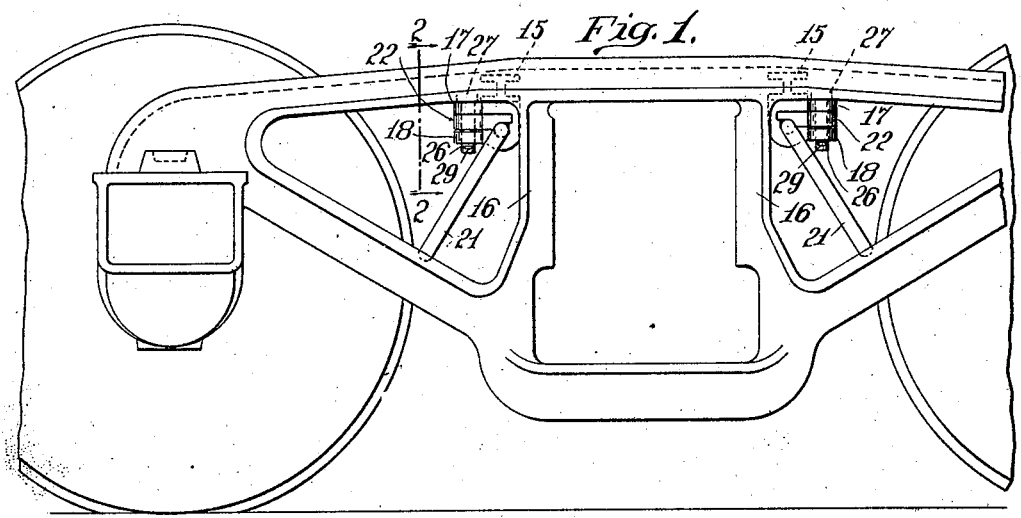
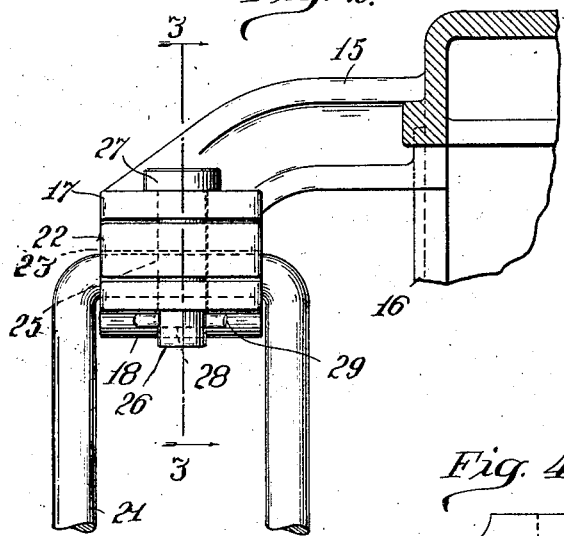
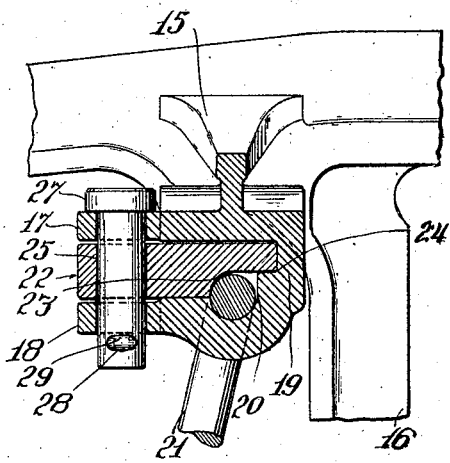
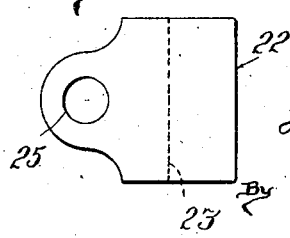
Inventor
Loyd J. Brown,
By George Heideman
Attorney

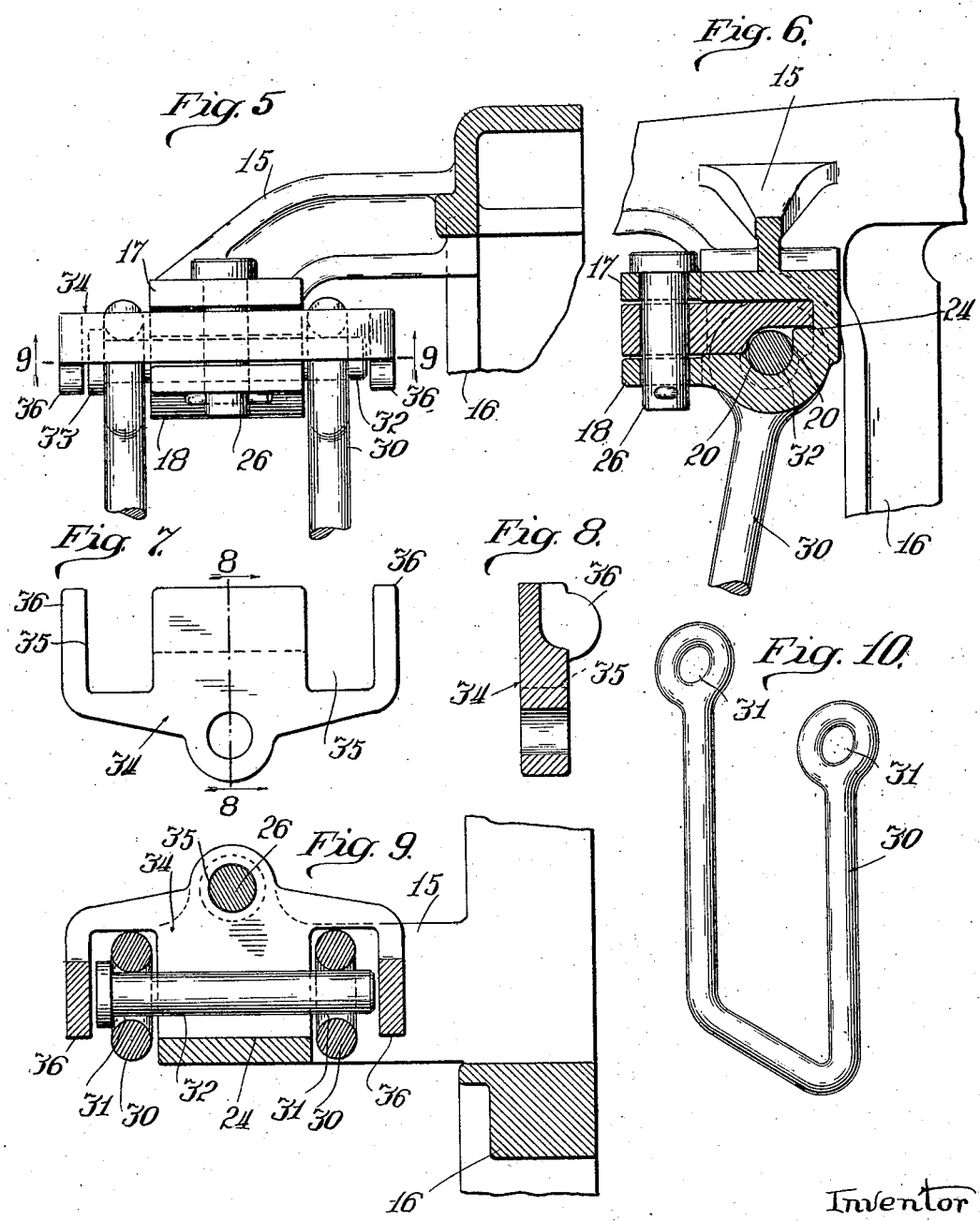

Patented Nov. 5, 1929

1,734,712

UNITED STATES PATENT OFFICE

LLOYD J. BROWN, OF EVANSTON, ILLINOIS, ASSIGNOR TO E. PAYSON SMITH, OF SPRINGFIELD, ILLINOIS

BRAKE-HANGER SUPPORT

Application filed December 24, 1925. Serial No. 77,628.

My invention relates to means for supporting the hangers whereby the brake beams are pendently held in place from the truck side frame. Truck side frames, as more generally employed at present, usually comprise a one piece structure made of cast or pressed steel and provided with apertured brackets or lugs, adjacent to the vertical compression members of the side frame, for the purpose of receiving a bolt or pin disposed through the apertured lug and through the eyes or openings in the brake hanger; the hanger being of a U-shape link type adapted to straddle the lug on the side frame and held in place by the head of the pin at one end and a split pin or cotter at the other. This method is objectionable because of the frequent loss of the split pins or cotters and the consequent dissociation of the members which would permit the brake heads and shoes to drop.

My invention has for its object the provision of a construction adapted to overcome these objections and which will permit of the substitution of a loop type of hanger, when desired, for the U-shape hangers and whereby the hangers will be securely held in place; the invention involving means which may be easily and readily put into place to maintain the hangers in proper position.

The objects and advantages of my invention will be more readily comprehended from the detailed description of the drawings, wherein:

Figure 1 is a side elevation of a truck side frame provided with one form of my hanger supporting means; the truck springs, brake beams and other elements being omitted.

Figure 2 is a detail elevation and partial section of a portion of the side frame with the supporting lug integral therewith, illustrating a loop type of hanger and my improved means.

Figure 3 is a sectional view taken substantially on the line 3—3 of Figure 1 looking in the direction of the arrows.

Figure 4 is a detail plan view of the hanger locking element or keeper plate.

Figure 5 is a view similar to Figure 2 of a portion of the side frame and lug, showing a modification of my invention.

Figure 6 is a view similar to Figure 3 illustrating the modification shown in Figure 5.

Figure 7 is a detail plan view of the locking element employed in Figure 5.

Figure 8 is a sectional view thereof taken on the line 8—8 of Figure 7.

Fig. 9 is a cross sectional view taken on the line 9—9 of Figure 5, looking in the direction of the arrows.

Figure 10 is a detail perspective view of the hanger employed in Figure 5.

Brake hangers have heretofore generally been suspended in place from apertured lugs adjacent to the sides of the vertical compression members of the side frame by means of a pin disposed through the holes in the lugs.

These lugs are usually formed integral with the side frame and disposed laterally on the inner or wheel sides of the frame and positioned where the suspended brakehead and shoe will be aligned with the tread of the wheel. The hangers employed have usually been of the U-shape type with apertured ends or eyes, through which a headed pin or bolt passes; the pin also passing through the aperture in the side framed lug, with the U-shape hanger straddling the lug; the pin being held in place by means of a split pin or cotter.

My invention consists in providing the inwardly disposed bracket arm or lug 15 (generally formed integral with the truck side frame at a point adjacent to the vertical compression members 16) with a transverse slot at the outer end of the lug 15, thereby providing the lug with a bifurcated end consisting of the upper and lower portions 17 and 18 integrally connected at a point rearward of the hanger or pin receiving socket as shown at 19. The lower portion 18 is provided with a socket at 20, which, in the construction shown in the first three figures of the drawings, is intended to receive one end of a link hanger 21 which is in the nature of a continuous loop as shown; the link or hanger being held free to have oscillatory movements in the socket portion 20. The ends or bifurcations 17 and 18 at their forward or outer ends are spaced apart sufficiently to not only permit passage of the link therebetween but to also receive a keeper plate or retaining member 22 which is preferably of width corresponding with the width of the bifurcations or ends 17 and 18 as shown in Figure 2. The inner end of the keeper plate or member 22 on its lower side is preferably dished as shown at 23 to fit over the upper end of the hanger 21 and permit the latter to have the swinging movement necessary. The slot is so formed that the inner or connected side 19 preferably is provided with a shoulder 24 to receive the reduced inner end of the keeper plate or retaining member 22, see Figure 3, thereby maintaining the latter in position and out of pressing frictional contact with the upper end of the hanger 21; the keeper plate passing over the hanger prevents undesirable vertical play. The plate or retaining member 22 is apertured at 25 which, when the keeper is in proper place, is adapted to register with similar apertures in the bifurcations 17 and 18 for the passage of a bolt or pin 26 provided with a head 27 which rests on the upper face of the bifurcation 17, while the lower end of the pin preferably extends through the bifurcation 18 and is shown apertured at 28 to receive a cotter or split pin shown at 29 in Figure 1. The bolt or pin 26 is thus held against displacement; although it is apparent that the pin 26 will be held in place by gravity in the event of displacement of the split key or cotter 29.

In Figures 5 to 10, I show the brake hanger in the nature of a U-shape link 30, shown in detail in Figure 10, the upper ends whereof are apertured as shown at 31 for the passage of a pin or bolt 32.

The side frame, like in Figure 1, is provided with the bracket arm or lug 15, having the transversely slotted end which provides the top and bottom bifurcations 17 and 18; with the bottom portion suitably dished or socketed at 20 to receive the suspending bolt or pin 32; one end whereof is usually provided with a head as shown at 33.

With this construction the eyes or apertured ends of the U-shaped link 30 extend above the horizontal plane of the bolt or pin 32, as shown in dotted lines in Figure 6 and in full lines in Figure 5. The keeper plate or retaining member 34, which enters the slot between the bifurcations 17 and 18 of the bracket arm, is shown of length greater than the width of the ends 17 and 18, see Figures 5 and 7, and therefore is provided with the cut-out portions or slots 35. 35 for the passage of the apertured ends of the suspending link 30.

The keeper plate or retaining member 34 at its inner end, like the keeper plate 22, is reduced to fit over the pin or bolt 32 and the rear end of the keeper plate rests on the shoulder 24. The sides of the keeper plate in alignment with the dished or reduced portion of the main part of the plate (namely where the plate passes over the bolt or pin 32) are each provided with a downward extension or lobe 36, disposed transversely of the path of the pin or bolt 32 as clearly shown in Figures 5 and 9.

With this type of keeper plate it is apparent that the pin or bolt cannot move longitudinally out of place and the use of a cotter-pin is obviated.

The keeper plate 34, like keeper plate 22 is held in place by means of the pin 26 which passes through registering apertures in the portions 17 and 18 and the outer end of the plate 34.

The type of hanger shown in Figure 10 is the one at present generally employed and which is now held in place by a bolt or pin passing through the apertured lug on the side frame, while the pin or bolt is held in place by a cotter-pin, which soon corrodes and breaks and is often lost, with the result that the link holding pin or bolt works out of plate and the brake mechanism is allowed to drop and cause serious accidents or delays.

With the supporting lugs or brackets as at present formed on the truck side frames, the use of the loop or link type of hanger shown in the first three figures of the drawings is impossible; a type of hanger which is greatly desired by the railroads because it provides a greater bearing surface entirely across the frame lug and therefore a more secure and lasting construction than is the case with the U-shaped hanger and suspending bolt now employed, where the wear is confined to the eyes of the hanger and principally to the ends of the bolt.

With my invention, interchange of the hangers may be quickly made by providing the ends of the lugs on the side frame with a transverse slot intersecting or extending from the outer end to the bolt receiving aperture therein as shown in the drawings, namely a slot adapted to receive the keeper plate 34 (if the U-shape type of hanger 30 is still to be employed) or the keeper plate 22 where the loop or link type of hanger 21 is to be substituted.

The invention has been shown in its application to different types of hangers or links and has been described in terms employed merely as terms of description and not as terms of limitation, as modifications may be made without, however, departing from the spirit of my invention.

What I claim is:

1. A brake hanger support for pendently securing the brake hanger to the truck side frame comprising a lug secured to the side frame and having a transverse slot extending inwardly from the free end of the lug, a keeper member of width corresponding to the depth of said slot and insertible edgewise into said slot to close the forward end thereof and extend flush with the outer end of the lug, the inner end of the keeper member being reduced, and means insertible through the outer end of the lug and the member whereby the keeper member is secured in place.

2. In combination with a truck side frame having a lug disposed toward the wheels of the truck and provided with a transverse slot to provide vertically spaced portions, the lower portion of the lug having a socket and shoulder at the inner end, a hanger suspended in the socket of said lower portion adjacent to the shoulder, a keeper member insertible between the spaced portions, dished at its inner end and seatable on said shoulder, and means for securing the keeper member in place.

3. A brake hanger support, comprising in combination with a laterally disposed lug secured to the side frame and transversely slotted at the outer end to provide upper and lower spaced portions having registering holes adjacent to the outer ends, a keeper plate adapted to fit between the spaced portions and having an opening arranged to register with the holes in the portions, and a pin disposed through the registering holes of the spaced portions and keeper plate.

4. Brake hanger support, comprising, in combination with a pair of spaced lugs secured to the truck side frame, a keeper plate provided with depending side extensions and adapted to be inserted between the lugs, and means whereby the keeper plate is locked in place.

5. A brake hanger support, comprising, in combination with a truck side frame provided with lugs adjacent to the vertical members of the side frame in alignment with the truck wheels, the outer ends of said lugs being transversely slotted to provide upper and lower spaced portions, and a brake hanger pivotally suspended intermediate of the portions, of a keeper plate adapted to be inserted between the portions and having side depending portions disposed across the pivotal point of the brake hanger, and means whereby the keeper plate is removably secured in place.

6. A brake hanger support, comprising the combination of a supporting lug provided with a transverse slot whereby the outer end has vertically spaced portions, a brake hanger, one end whereof straddles the lower portion of said lug, a supporting pin disposed through said slot and the ends of said hanger, a keeper plate insertible between the portions and slotted transversely at opposite ends to straddle the ends of the hanger and of said supporting pin, and means for holding said keeper plate in place.

7. A brake hanger support, comprising the combination of a supporting lug provided with a transverse slot whereby the outer end has vertically spaced portions, a brake hanger, one end whereof straddles the lower portion of said lug, a supporting pin disposed through said slot and the ends of said hanger, a keeper plate insertible between the portions with its inner end disposed across the top of said pin and the sides formed to extend across the ends of said pin to prevent longitudinal movement of the latter, and means for securing said keeper plate in place.

8. A brake hanger support comprising a supporting lug having a transverse slot whereby the outer end of the lug is formed with vertically spaced portions between which the hanger is pendently secured, a flat plate of width corresponding to the depth of said slot and insertible therein for closing the passage between the portions, and means disposed through the spaced portions and said plate for locking the latter in place.

9. In a brake hanger support, a truck side frame provided with an arm disposed laterally and terminating in a projection extending in a direction substantially parallel with the wheels of the truck, said projection being slotted transversely to provide vertically spaced portions at the outer end, the lower portion at the inner end of the slot being socketed to pendently receive the hanger, the spaced portions being provided with registering holes, and means disposed through said holes.

10. In a brake hanger support, a truck side frame provided with an angular lug extending inwardly from the truck frame with its free end disposed in alignment with the wheels of the truck, said free end being slotted to provide vertically spaced portions, the inner end of the lower portion being socketed transversely and provided with a shoulder extending throughout the width of the portion, a member slidable between the portions, the the inner end of the member being dished to pass over said socket and to rest on said shoulder, and means whereby said member is locked in place.

LLOYD J. BROWN.